H. LAURENCE.
Improvement in Pickle-Forks.
No. 130,923. Patented Aug. 27, 1872.
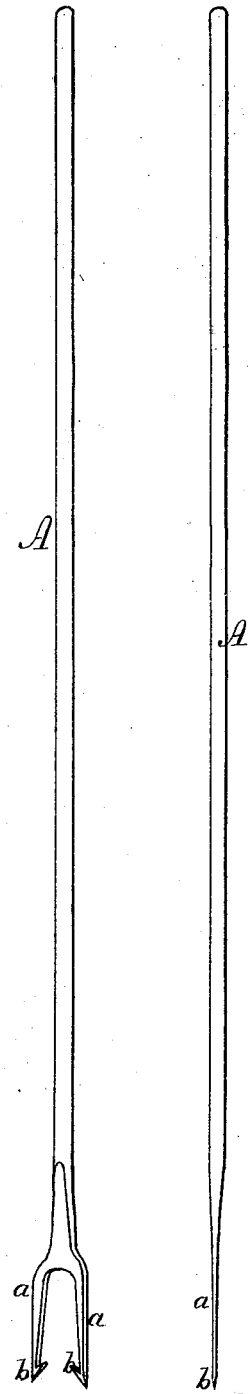

UNITED STATES PATENT OFFICE.

HENRY LAURENCE, OF NEW ORLEANS, LOUISIANA.

IMPROVEMENT IN PICKLE-FORKS.

Specification forming part of Letters Patent No. 130,923, dated August 27, 1872.

I, HENRY LAURENCE, of the city of New Orleans, in the parish of Orleans and State of Louisiana, have invented a new and useful Improvement in Pickle-Forks, of which the following is a specification:

My invention consists in forming the prong or prongs of pickle-forks with barbs or hooked projections in order to secure the hold of the fork on the pickle or other substance to be withdrawn from the bottle or other receptacle.

In the accompanying drawing I have represented a perspective and side view of a pickle-fork embracing my invention.

I design by my improvement to furnish a neat and convenient fork or article to be used in taking pickles, preserved fruits, or vegetables from their receptacles with ease and certainty, and without dropping them on the table-cloth or table, which frequently happens, especially when such condiments are served in high or narrow-necked bottles, jars, or other receptacles, from which it is difficult to pick out pickle or fruit with a common fork or spoon. With my new fork, however, any single pickle, for instance, can be taken from even the bottom of a jar without that trouble which would be inevitable were it attempted with a common fork or spoon.

My improved fork is formed by providing its prongs $a$, which are sharp-pointed, with one or more barbed projections or hooks, $b$, which will enable the prong, when it once enters a piece of pickle or other article, to retain its hold upon the same while being drawn from the bottle, while the pickle is easily removed from the fork after being taken out of the bottle.

I prefer to make the prong or prongs and projections or barbs with flattened sides, which will prevent injury to any one when handling the fork. I prefer also to form the barbs or projections $b$ on the inner side of the prongs, for in this way they will not be so liable to catch into the table-cloth or anything else; but I do not desire to confine myself to this exact construction or position of the barbs or projections, although I consider that shown and described the best, for the barbs may be on the outside only, or on the inner and outer sides of the prongs, or the prongs may be provided with a series of either straight or twisted barbs or projections $b$. Nor is the spirit of my invention changed by the number, or size, or shape of the prongs.

I propose to make the handle A of my improved pickle-fork ornamental, so as to make the entire device pleasing to the eye, while for common use it may consist of merely a rod, as shown in the drawing.

It is obvious that the barbs or hooked projections $b$, instead of being rigidly attached to or formed on the prongs of the fork, may be pivoted to the lower end of the prongs, so that when the fork is pushed down into the pickles the barb will lie flush with the prong, only allowing its point to project and seize in the pickle pierced by the prong.

The advantages of my improved device are so obvious and apparent that I need not state them.

Having described my invention, I claim—

A table-fork with sharp-pointed prongs, provided with a barb or barbs above the point or points of the prongs, substantially as and for the purpose set forth.

The above specification of my improvement in pickle-forks signed this 19th day of August, 1871.

HENRY LAURENCE.

Witnesses:
 A. E. H. JOHNSON,
 ALEXR. A. C. KLAUCKE.